Figure 1:
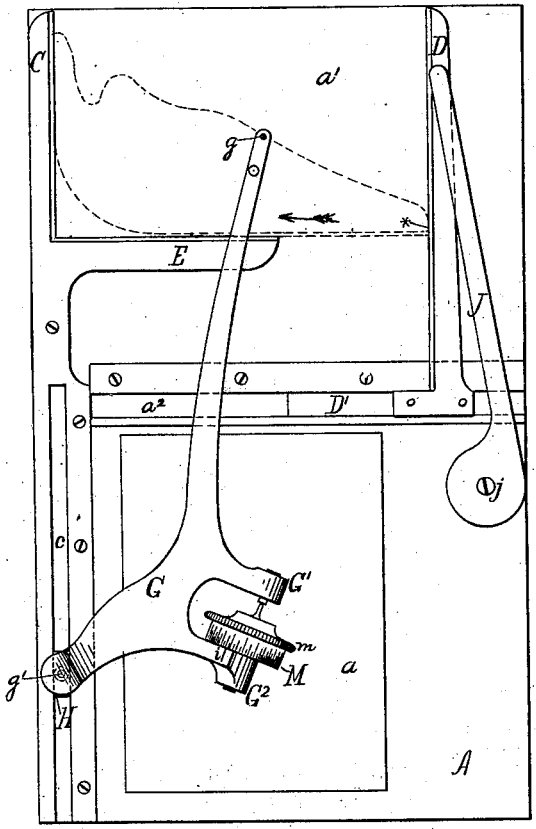

(Model.)

J. COFFIN.
AVERAGEOMETER OR INSTRUMENT FOR MEASURING THE AVERAGE BREADTH OF IRREGULAR PLANES.

No. 258,993. Patented June 6, 1882.

Witnesses
Charles C. Stetson.
M. F. Boyle.

Inventor
John Coffin

United States Patent Office.

JOHN COFFIN, OF SYRACUSE, NEW YORK.

AVERAGEOMETER OR INSTRUMENT FOR MEASURING THE AVERAGE BREADTH OF IRREGULAR PLANES.

SPECIFICATION forming part of Letters Patent No. 258,993, dated June 6, 1882.

Application filed July 6, 1881. (Model.)

*To all whom it may concern:*

Be it known that I, JOHN COFFIN, formerly of Syracuse, in the county of Onondaga and State of New York, but about to be moving to Chicago, in the county of Cook and State of Illinois, have invented a certain new and Improved Averageometer, or Instrument for Measuring the Average Breadth of Irregular Planes; and I do hereby declare that the following is a full and exact description thereof.

A construction common to my instrument and the previously-known planimeters is a freely-turning wheel having its edge milled with sharp ridges extending directly across, so as to lie parallel to the axis, mounted near one end of a movable bar, the other end of which bar carries a tracing-point, which is caused by the operator to traverse along the boundary of the figure until it has moved quite around.
The former end, which I will call the "pivoted" end, is guided so that it shall simply traverse backward and forward. The peculiarly-prepared edge of the wheel, engaging with a sheet of paper or other suitable surface on the table, is caused to revolve during the movement of the pointer around the figure to an extent which exactly indicates the area of the figure.

I have designed the instrument more especially for measuring the mean height of indicator-diagrams taken on steam-engines by instruments and means used by engineers to indicate the working condition and power of the engine, the adjustment of the valves, the existence of back-pressure, &c. I will term the figure to be measured a "diagram."

Instead of reciprocating the pivoted end of the bar in a curved path, I reciprocate it in a rectilinear path. I provide two efficient parallel rulers or raised guides, between which the diagram to be measured is embraced. One of the rulers or guides is exactly in line with the straight path of the pivoted end. The diagram to be measured is placed with one side in contact with it. The other ruler is placed at just a sufficient distance therefrom to be in contact with the extreme opposite boundary of the diagram. I have made the rulers serve as spring-clamps to hold the paper of the diagram extended upon a suitable plane-bed underneath. Having placed the scribing-point at a point on the figure where it touches the movable ruler, I turn the wheel until the zero-mark on the wheel is brought to coincide with a fixed mark on an adjacent part of the lever. Then I slowly scribe around the entire figure, taking care to follow the line exactly and to stop at exactly the point started from. Now, by looking at the wheel and observing how far it has turned, I make a note of it for future use, if desired. The novel use of the instrument is next attained by simply moving the scribing-point up along the edge of the movable ruler, which will cause the wheel to turn backward. As the zero-mark is brought nearly into position this movement should be very slow and careful, and the moment that the zero-mark is brought to exactly coincide with the stationary mark the scribing-point is pricked into the paper. The distance of this point from the original starting-point gives the mean height of the diagram. This latter dimension is the important element in ascertaining the horse-power of an engine. It is usually found from indicator-cards by elaborate computation. My instrument gives it at once without any expenditure of time or labor. It requires no skill beyond a capacity to observe accurately and to move the scribing-point on a line and to start or stop it at the proper places.

The accompanying drawings form a part of this specification and represent what I consider the best means of carrying out the invention.

Figure 2:
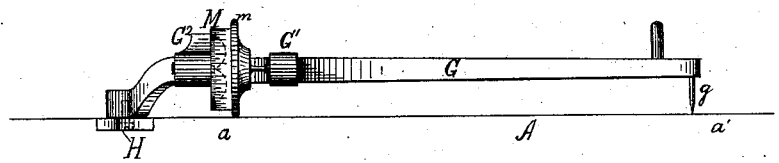

Figure 1 is a plan view, looking down upon the table, with the device in place. Fig. 2 is an elevation, looking toward the side on which the wheel M is placed.

Similar letters of reference indicate like parts in both the figures.

A is a portable table, of well-seasoned wood, preferably in two or more layers glued together, with the grains crossing each other to insure against warping. One portion of the surface $a$ is faced with paper of uniform softness, adapted to receive the impression of the sharply-cut edge of the wheel, and to properly hold the periphery of the wheel and cause it to turn as required. Another portion of the surface $a'$ receives the successive pieces of paper or other material on which are the indicator-diagrams or other figures to be measured.

C and D are steel or other metallic clamps, serving also as rulers. They clamp the paper of the diagram between themselves and the table $a'$, and thus hold the paper carefully extended. Both may be lifted a little from the surface $a'$ to allow the introduction of the paper. In other respects they are different. The clamp C is stationary. The clamp D is movable, and has a rigidly-connected T-piece, $D'$, which is free to traverse in a cross-groove, $a^2$. Its motion is like that of an ordinary T-square, and its functions are somewhat similar. The groove $a^2$ may be guarded by metal.

J is a spring turning on a fixed pivot, $j$, and it may be adjusted to bear on the ruler D in any position and exert a requisite pressure to cause it to act efficiently as a clamp. The clamping-piece C is extended downward across the portion $a$ of the board, and carries a straight and accurately-formed groove, $c$. This groove $c$ is exactly in line with the working-edge of the clamp C.

G is a bent bar, preferably of considerable weight. In one end is fixed a scribing-point, $g$. To the other end is connected by a pivot, $g'$, a block, H, which matches in the groove $c$ and is free to slide longitudinally therein, being accurately guided thereby. The bar G is formed with jaws $G'$ $G^2$, equipped with screw-pivots, or otherwise prepared to delicately center the wheel M. This wheel is graduated on its surface, and is provided with a flange which extends a little beyond the graduated portion, and is milled transversely, as indicated by $m$.

E is a roller or bar, formed in one piece with the ruler C, extending partly or entirely across the board at right angles to the rulers C D.

It is common in the taking of indicator-cards to produce by the action of the indicator a base-line, which is known as the "air-line" or "atmospheric line." In placing the card in my instrument the air-line is brought into coincidence with or parallel to the ruler E. The paper is adjusted laterally, so as to bring the left edge of the diagram exactly touching the edge of the fixed ruler C. Then the other ruler, D, is adjusted at such distance from C as to just touch the opposite edge of the diagram, the paper being smoothly extended. The bar G is now brought into position, with the block H fitted in the groove $c$. The scribing-point $g$ is applied at the point * and pricked delicately into the paper of the diagram. The wheel M is now lifted nearly or quite out of contact with the paper and turned until its zero-mark coincides with the fixed mark $i$. Then it is again allowed to engage with the paper, and all is ready for work. The operator lifts the scribing-point $g$ out of the slight hole in which it has been impressed, and steadily and exactly traces around the diagram in the direction indicated by the arrow until the point $g$ has arrived at the same point again. After resting here a moment to observe the indication on the wheel, the scribing-point $g$ is lifted out of its slight hole in the paper and moved upward, being pressed gently against the adjacent edge of the metal ruler D. This movement causes the wheel M to be revolved in the direction toward the zero-mark, and is continued until it has revolved exactly to zero. The scribing-point $g$ will then be at such a distance from the atmospheric line that a horizontal line drawn from there across to the other ruler would inclose a rectangle of an area exactly equal in area to that of the irregular diagram measured. This result has been determined by trial. It may not be difficult to determine it from theoretical considerations. In traversing around a rectangle the movement to the left exactly offsets the movement to the right. The movement up on one side does not balance the movement down on the other, by reason of the different angles formed by the axis of the wheel with the line of motion during the two movements. When the rectangle is commenced by the movement along the edge of the ruler just above described all the other three sides of the rectangle are of no effect on the instrument, and the single line along the edge of the ruler D is the only one which produces any final effect. It is the same as if the rectangle were completed, because if the rectangle were completed the traverse down the opposite side of the rectangle would not turn the wheel at all, because it is exactly in the line of the slot $c$, and the traverse to the left and to the right exactly neutralize each other. When the point $g$ has been moved along the ruler D of this instrument until the wheel has turned a like amount the point reached will give the height of a parallelogram of equal length, possessing the same area.

In successfully working the invention it is only necessary to operate as prescribed and to note accurately the result. The point $g$ is moved gently along the edge of the ruler D and the effect on the wheel M observed.

Modifications may be made. Parts of the invention may be used without the whole. The rulers C and D may be made to serve relatively to the diagram without performing the additional function of clamps to hold the paper. I can dispense with the projecting qualities of what I have termed the "rulers" C D, and use only lines in black or any color carefully drawn on the paper, taking care that they be parallel to each other and at right angles to the ruler or corresponding line, E. I can dispense with the paper $a$, employing any other material having a surface capable of taking proper hold on the milled periphery $m$ of the wheel M. Instead of a single wide and deep groove, $c$, I can employ two or more, which may be narrower and less deep, the block H being finished to match. One or more ridges instead of grooves may serve. With a single deep groove, $c$, I can dispense with the block H and employ a simple pin projecting from the bar G into the groove. I prefer a block, H, of considerable length, truly finished, and delicately pivoted to the bar G, as shown. The bar G is made of considerable weight and of the form described to induce a just sufficient pressure of the wheel M upon the paper or table.

I find by practice that the instrument works well without the milling on the part $m$ of the wheel M, and that with a smooth wheel the recording is done very accurately and satisfactorily; but I prefer the milling as more complete assurance against slipping of the wheel M circumferentially, while allowing it to easily slip axially on the paper or surface $a$ which controls it.

I claim—

1. A planimeter having the soft-surfaced table A $a$ and groove or straight guiding means $c$, in combination with the adjustable ruler D, mounted parallel to the line of the groove $c$, and with the wheel M $m$, and bar G, with its guiding-point $g$ and pivot $g'$ engaging through the block H or otherwise with the groove $c$, and arranged as herein specified.

2. The combination, with the parts M $m$ G $g$ $g'$ H A $a$ $c$, of the ruler C, fixed in the extended line of the guiding means $c$, and the adjustable ruler D, parallel to C, as herein specified.

3. The combination, with the ordinary parts of a planimeter, of the spring-ruler C in line with the guiding-groove $c$, adapted to serve both in determining the position and clamping or holding the paper $a'$, on which is the diagram to be measured, and also of the spring-ruler D, parallel to C, arranged to serve both in holding the paper $a'$ and guiding the scribing-point $g$ in the final movement to determine the height of an equal rectangle, as herein specified.

In testimony whereof I have hereunto set my hand, at New York city, New York, this 5th day of July, 1881, in the presence of two subscribing witnesses.

JOHN COFFIN.

Witnesses:
CHARLES C. STETSON,
M. F. BOYLE.